United States Patent
Hong

(10) Patent No.: US 12,238,670 B2
(45) Date of Patent: Feb. 25, 2025

(54) MULTI-CARD USER EQUIPMENT AND COMMUNICATION METHOD THEREFOR, AND NETWORK DEVICE

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 520 days.

(21) Appl. No.: 17/603,577

(22) PCT Filed: Apr. 25, 2019

(86) PCT No.: PCT/CN2019/084390
§ 371 (c)(1),
(2) Date: Oct. 13, 2021

(87) PCT Pub. No.: WO2020/215291
PCT Pub. Date: Oct. 29, 2020

(65) Prior Publication Data
US 2022/0210757 A1 Jun. 30, 2022

(51) Int. Cl.
*H04W 60/00* (2009.01)
*H04W 8/20* (2009.01)
*H04W 88/06* (2009.01)

(52) U.S. Cl.
CPC ........... *H04W 60/005* (2013.01); *H04W 8/20* (2013.01); *H04W 88/06* (2013.01)

(58) Field of Classification Search
CPC ............................. H04W 48/08; H04W 88/06
(Continued)

(56) References Cited

U.S. PATENT DOCUMENTS 8,843,124 B2   9/2014  Fan et al.
10,136,406 B2  11/2018 Guo
(Continued)

FOREIGN PATENT DOCUMENTS

CN   101001447 A   7/2007
CN   101355749 A   1/2009
(Continued)

OTHER PUBLICATIONS

International Search Report of PCT/CN2019/084390 dated Jan. 2, 2020 with English translation, (4p).
(Continued)

*Primary Examiner* — Fabricio R Murillo Garcia
(74) *Attorney, Agent, or Firm* — Arch & Lake LLP

(57) ABSTRACT

A communication method for multi-card user equipment, comprising: after a multi-card UE finishes registering to a first operator network by using a first USIM, and when receiving an information request that is initiated by the first operator network for acquiring the USIM that is used by the multi-card UE and that belongs to a non-first operator network, the multi-card UE feeding back information of the USIM belonging to the non-first operator network to the first operator network; and the multi-card UE receiving configuration information for the non-first operator network that is sent by the first operator network, and operating in the non-first operator network according to the received configuration information.

13 Claims, 2 Drawing Sheets

(58) Field of Classification Search
USPC .................................................... 455/435.1
See application file for complete search history.

(56) References Cited

U.S. PATENT DOCUMENTS

| | | | | |
|---|---|---|---|---|
| 2009/0131054 | A1* | 5/2009 | Zhang .................. | H04W 76/20 |
| | | | | 455/458 |
| 2010/0120410 | A1 | 5/2010 | Fan et al. | |
| 2012/0149372 | A1 | 6/2012 | Lee | |
| 2014/0200048 | A1 | 7/2014 | Cheng | |
| 2015/0163827 | A1* | 6/2015 | Ekici .................... | H04W 68/02 |
| | | | | 370/338 |
| 2015/0296364 | A1* | 10/2015 | Peruru ................. | H04W 88/06 |
| | | | | 455/434 |
| 2016/0105864 | A1* | 4/2016 | Guo ...................... | H04W 8/04 |
| | | | | 455/435.1 |
| 2018/0124868 | A1* | 5/2018 | Gupta ................. | H04W 36/362 |

FOREIGN PATENT DOCUMENTS

| | | |
|---|---|---|
| CN | 103298070 A | 9/2013 |
| CN | 104144528 A | 11/2014 |
| CN | 104396330 A | 3/2015 |
| CN | 104969589 A | 10/2015 |
| CN | 105072706 A | 11/2015 |
| CN | 105722163 A | 6/2016 |
| CN | 106454893 A | 2/2017 |
| CN | 107438243 A | 12/2017 |
| CN | 108377574 A | 8/2018 |
| CN | 108601098 A | 9/2018 |
| CN | 104396330 B | 12/2018 |
| CN | 108966227 A | 12/2018 |
| CN | 1004396330 B | 12/2018 |
| CN | 110214461 B | 1/2022 |
| WO | 2014201689 A1 | 12/2014 |

OTHER PUBLICATIONS

First Office Action issued to Chinese Application No. 201980000748.2, dated Jun. 24, 2021 with English translation, (16p).
Xu Xin, "The Design and Implementation of Virtual SIM Card Based on Android Platform", China Master's Theses Full-text Database, (76p).
The First CNOA issued in CN Application No. 202210004811.3 dated Aug. 31, 2023 with English translation, (10p).

* cited by examiner

MULTI-CARD USER EQUIPMENT AND COMMUNICATION METHOD THEREFOR, AND NETWORK DEVICE

CROSS-REFERENCE TO RELATED APPLICATION

The present application is the U.S. national phase of PCT Application No. PCT/CN2019/084390, filed on Apr. 25, 2019, the content of which is incorporated hereby in its entirety for all purposes.

TECHNICAL FIELD

The present disclosure relates to multi-card mobile phone technology, in particular to multi-card user equipment, as well as a communication method and a network device thereof.

BACKGROUND

With the development of wireless communication technology, there are more and more multi-card mobile phones on the market. The typical application scenarios of multi-card mobile phones mainly include the following two:

1. Business users have a private card and a business card, and put the two cards into the same mobile phone.
2. Ordinary users have multiple private cards, and choose one of these cards to use according to their business.

These cards may come from the same operator or from different operators.

At present, the processing methods for multi-card mobile phones are mainly based on the implementation of various terminal manufacturers, and there is no uniform standard, which leads to a variety of different terminal behaviors and processing methods (for example, dual-card single-standby, dual-card dual-standby single-pass, dual-card dual-standby dual-pass, etc.), and may cause the following problems:

1) When the multi-card terminal is communicating with a first system, it needs to check a second system from time to time, such as listen for paging, take measurements, read system messages and so on. This may affect the performance of the first system.

2) Multi-card terminals have multiple SIM cards, which may cause systematic paging collisions, since a paging time is calculated based on the UE's identity.

3) When the multi-card terminal receives a paging message on the second system, it needs to decide whether it needs to respond to the paging, and this is based on the rules configured by the user.

4) When the multi-card terminal determines to respond the corresponding paging message of the second system, it needs to stop operations currently being performed on the first system. If there is no suspension mechanism for the current operations, the UE will automatically disconnect Radio Resource Control (RRC) connection with the first system and leave the first system (i.e. offline). In addition, after the UE leaves, the first system will constantly page the UE, resulting in a waste of paging resources.

SUMMARY

The present disclosure provides a multi-card UE as well as a communication method and a network device thereof.

According to a first aspect of the present disclosure, there is provided a communication method for multi-card user equipment (UE). The communication method for multi-card user equipment (UE) may include: registering with a first operator network by the multi-card UE using a first Universal Subscriber Identity Module (USIM); in response to receiving a request for obtaining information about a USIM belonging to a non-first operator network used by the multi-card UE, feeding back, by the multi-card UE, the information about USIM belonging to the non-first operator network to the first operator network, wherein the request is initiated by the first operator network; and receiving, by the multi-card UE, configuration information for the non-first operator network sent by the first operator network, and operating in the non-first operator network according to the received configuration information.

According to a second aspect of the present disclosure, there is provided multi-card user equipment (UE). The multi-card user equipment (UE) may include: a processor; memory for storing instructions executable by the processor; wherein the processor is configured to execute instructions for implementing: registering with a first operator network by the multi-card UE using a first Universal Subscriber Identity Module (USIM); in response to receiving a request for obtaining information about a USIM belonging to a non-first operator network used by the multi-card UE, feeding back, by the multi-card UE, the information about USIM belonging to the non-first operator network to the first operator network, wherein the request is initiated by the first operator network; and receiving, by the multi-card UE, configuration information for the non-first operator network sent by the first operator network, and operating in the non-first operator network according to the received configuration information.

According to a third aspect of the disclosure, there is provided a communication method for multi-card user equipment. The communication method for multi-card user equipment may include: after a registration with an operator network by user equipment (UE) is completed, in response to an operator network device determining that the UE is a multi-card terminal, requesting, by the operator network device to the UE, obtaining information about a Universal Subscriber Identity Module (USIM) belonging to other operator network used by the UE, the other operator network is an operator network other than the operator network; and receiving, by the operator network device, the information about the USIM belonging to the other operator network used by the UE, which is fed back by the UE; calculating, based on the received information about the USIM, configuration information for the other operator network by the UE, and sending the configuration information to the UE; and notifying the UE to operate in the other operator network according to the configuration information.

BRIEF DESCRIPTION OF THE DRAWINGS

The drawings herein are incorporated into the specification and constitute a part of the specification to show examples that conform to the disclosure, and are used together with the specification to explain the principle of the disclosure.

DETAILED DESCRIPTION

Figure 1:
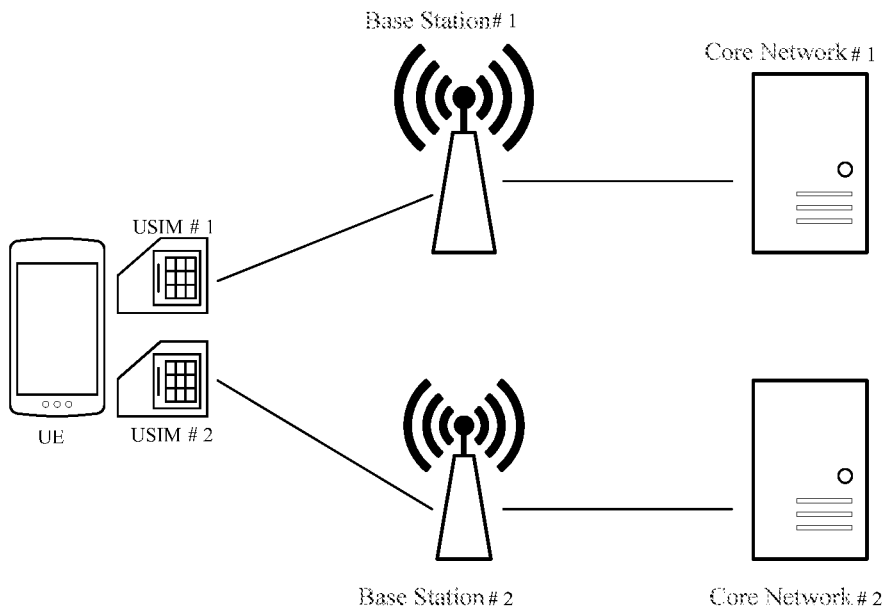
FIG. 1 is a schematic diagram showing a network architecture for implementing a multi-card UE communication method according to one or more examples of the present disclosure.

Herein, the exemplary embodiments will be described in detail, and examples thereof are shown in the accompanying drawings. When the following description refers to the drawings, unless otherwise indicated, the same numbers in different drawings indicate the same or similar elements. The implementation manners described in the following exemplary embodiments do not represent all implementation manners consistent with the present disclosure. On the contrary, they are merely examples of devices and methods consistent with some aspects of the present disclosure as detailed in the appended claims.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 is a schematic diagram of a network architecture for implementing a multi-card UE communication method according to an example of the present disclosure. As shown in FIG. 1, in this example, the multi-card UE is equipped with dual cards of USIM#1 and USIM#2. The operator network includes two parts: a base station and a core network device. Base Station #1 is an access base station in a first operator network (Operator Network #1), and Core Network Device #1 is a core network device in the first operator network. Base Station #2 is an access base station in a second operator network (Operator Network #2), and Core Network Device #2 is a core network device in the second operator network.

The normal operating process of a dual-card mobile phone based on the above network architecture includes the following operations.

After the UE's USIM#1 (Universal Subscriber Identity Module) is turned on, UE registers with the core network device #1 of the operator network #1 via the base station #1 of the operator network #1, and informs, during the registration process, the operator network #1 that UE also has a USIM #2 belonging to the operator network #2 (that is, the operator network #1 is notified that said UE is a multi-card terminal), but the information about USIM #2, such as IMSI (International Mobile Subscriber Identification Number) will not be informed to the operator network #1. In practical applications, the UE can transmit a notification that the UE is also equipped with the USIM#2 belonging to the operator network #2 to the core network device of the operator network #1 via a registration request signaling.

After receiving the notification, the core network device #1 of the operator network #1 requests the UE for the information about the USIM#2, such as the IMSI number, through the base station #1 after the registration of the UE's USIM#1 is completed. After receiving the request for reporting USIM#2, the UE reports information about USIM#2 to the core network device #1 of the operator network #1 via the base station #1. After receiving the information about USIM#2, the core network device #1 of the operator network #1 configures the UE, such as time information of listening for USIM#2 paging, paging cycle of listening for USIM#2, measurement time information of listening for USIM#2, and reading time of listening for the system message of USIM#2, etc., and sends the above configuration information to the UE via base station #1.

After the UE performs listening according to the above configuration, when the UE communicates with the operator network #1, because the operator network #1 pre-determines the configuration information for the UE to use USIM #2, the operator network #1 can determine that the UE's offline at the time indicated by the configuration information is caused by operations such as listening for the operator network #2, etc., but not by the wireless network. In this way, when the operator network #1 determines that the UE's offline is caused by operations such as listening for the operator network #2, it no longer repeatedly paged the UE, thereby reducing the impact on the present operator network #1 when the multi-card UE is operated in the other operator network, and the paging resources can be used rationally, which can also reduce the probability of paging collisions.

In this example, it is only an example to illustrate that the UE's USIM#1 can inform the operator network #1 during the registration process that the UE is also equipped with a USIM#2 belonging to the operator network #2 (that is, informs the operator network #1 that the UE is a multi-card terminal). However, for operator network #1, there can be multiple ways to know whether the UE is a multi-card terminal, for example, a notification method that UE does not notify it actively, a notification method that operator network #1 obtain it actively, etc. This disclosure does not make special limit about it.

Figure 2:
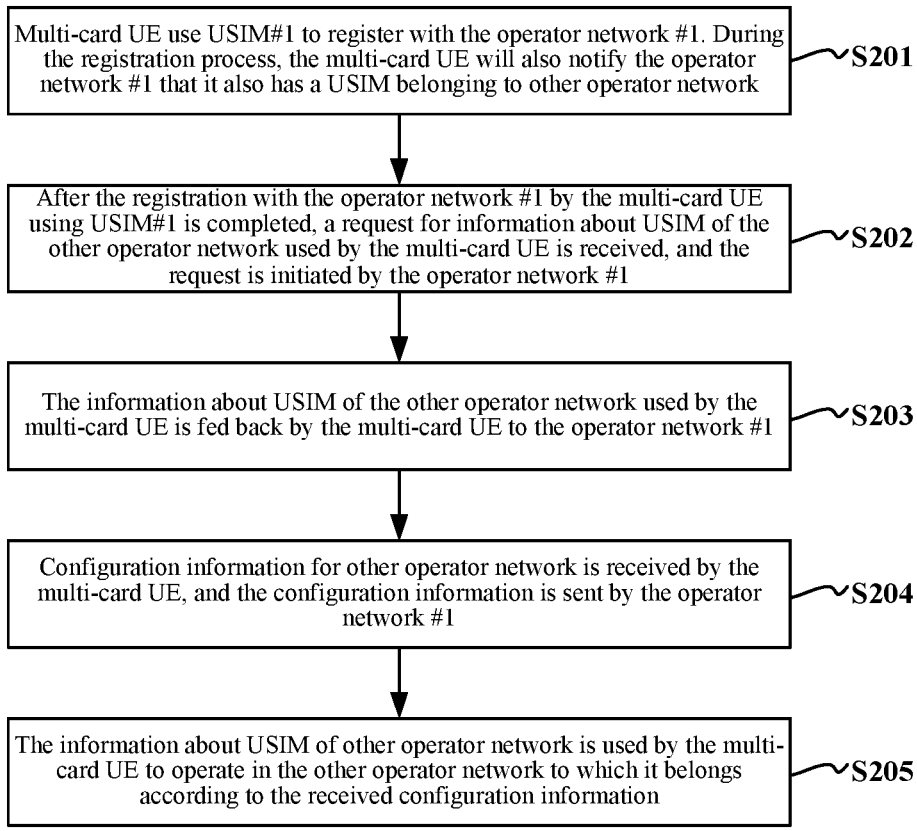
FIG. 2 is a flow chart showing a method for implementing multi-card UE communication according to one or more examples of the present disclosure.

FIG. 2 is a flow chart showing a method for multi-card UE communication according to an example of the present disclosure. Referring to FIG. 2, the method mainly includes the following steps.

In S201, USIM#1 is used by the multi-card UE to register with the operator network #1. During the registration process, the multi-card UE will also notify the operator network #1 that the multi-card UE also equipped with a USIM belonging to other operator network (for example, USIM#2 of operator network #2, or USIM#3 of operator network #3, etc.).

In this S201, the UE only informs the operator network #1 that the UE is a multi-card terminal, and does not send detailed information of the USIM of other operator network used by the UE to the operator network #1. In practical applications, the multi-card UE can send the above notification via the registration request signaling.

In S202, after the registration with the operator network #1 by the multi-card UE using USIM#1 is completed, a request for information about USIM of the other operator network used by the multi-card UE is received, and the request is initiated by the operator network #1

In S203, the information about USIM (for example, the IMSI of the UE) of the other operator network used by the multi-card UE is fed back by the multi-card UE to the operator network #1.

In S204, configuration information for other operator network is received by the multi-card UE, and the configuration information is sent by the operator network #1.

In this example, the configuration information of other operator network may include time information of listening for paging belonging to other operator network, measurement time information of listening for USIM belonging to other operator network, and a reading time of listening for the system message belonging to other operator network, etc.

In S205, the information about USIM of other operator network is used by the multi-card UE to operate in the other operator network to which the multi-card UE belongs, according to the received configuration information.

Figure 3:
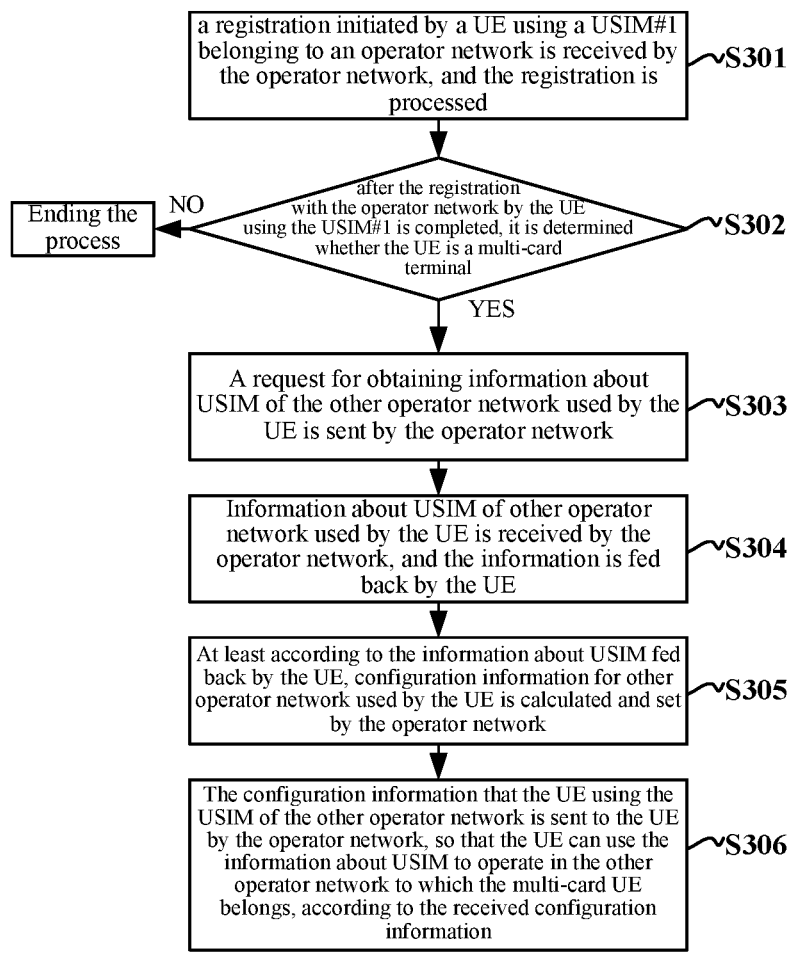
FIG. 3 is a flow chart showing another method for implementing multi-card UE communication according to one or more examples of the present disclosure.

FIG. 3 is a flow chart showing another method for implementing multi-card UE communication according to an example of the present disclosure. Referring to FIG. 3, the method mainly includes the following steps.

In S301, a registration initiated by a UE using a USIM#1 belonging to an operator network is received by the operator network, and the registration is processed.

During the registration process, the operator network may receive a notification sent by the UE that the UE is also equipped with a USIM belonging to other operator network (for example, the USIM#2 of the operator network #2, or the USIM #3 of the operator network #3, etc.). At this time, the operator network can identify the UE as a multi-card terminal based on this notification.

In the present disclosure, what the UE sends is only a notification that the UE is a multi-card terminal, and this notification does not send detailed information about the USIM of other operator network used by the UE to the operator network. In practical applications, the operator network can obtain the above notification through the registration request signaling sent by the multi-card UE.

In S302, after the registration with the operator network by the UE using USIM#1 is completed, it is determined, by the operator network, whether the UE is a multi-card terminal. If the UE is a multi-card terminal, S303 is performed, and if the UE is not a multi-card terminal, this process is ended, and operations in the existing process are performed.

The determination operation of this step S302 is mainly performed based on the operation of the above step S301, that is, the determination result is obtained according to whether a notification that the UE is configured as a multi-card terminal is received during the registration process. In response to determining the UE is a multi-card terminal, subsequent processing can be performed according to the technical solution of the present disclosure. In response to determining the UE is not a multi-card terminal, the corresponding processing can be performed according to the prior art. As a result, the operator network in the present disclosure can be compatible with the operation of the existing technology while executing the method of the present disclosure, thus reducing the impact on the existing operator network.

In addition, the operation of the above steps is only an implementation in this example, that is, in this example, the UE actively informs the operator network that it is a multi-card terminal during the registration process. In this disclosure, the method for the operator network to know whether the UE is a multi-card terminal is not limited to the method in this example. Any other method can be used to learn whether the UE is a multi-card terminal (such as, the operator network actively obtains such information), which will not affect the implementation of the present disclosure.

In S303, a request for obtaining information about USIM of the other operator network used by the UE is sent by the operator network.

In S304, the information about USIM (for example, the IMSI of the UE) of other operator network used by the UE fed back by the UE is received by the operator network.

In S305, at least according to the information about USIM of other operator network to be used by the UE fed back by the UE, configuration information for other operator network used by the UE is calculated and set by the operator network. For example, the configuration information may include time information of listening for paging belonging to other operator network, measurement time information of listening for USIM belonging to other operator network, and a reading time of listening for the system message belonging to other operator network, etc.

In this step, when the operator network calculates the configuration information of other operator network, the operator network can calculate according to the USIM#1 belonging to this operator network and/or the USIM belonging to other operator network, and an algorithm used for this calculation can be any existing algorithm. The present example does not impose special limitation on it.

In S306, the configuration information that the UE using the USIM of the other operator network is sent to the UE by the operator network, so that the UE can use the information about USIM to operate in the other operator network to which the multi-card UE belongs according to the received configuration information.

After the operation according to the above step S306 is completed, if the UE receives configuration information about the USIM of the other operator network sent in step S306 and performs communication operations according to the configuration information, in response to that the UE disconnects the RRC connection and off lines during the communication with the operator network, the operator network can determine, based on the preset configuration information that the UE using other USIM, whether the UE's offline is caused by the wireless network or the listening operation of other operator network system. In this way, when the operator network determines that the UE's offline is caused by the listening operation for other operator network system, the UE can no longer be paged repeatedly, thereby reducing the impact on the present operator network when the multi-card UE is operated in the other operator network, and the paging resources can be used rationally, which can also reduce the probability of paging collisions.

The architecture of a multi-card UE shown in this example at least includes a first operator network access processing unit, a non-first operator network access processing unit, and a configuration operation unit. The main functions of these three units are described below.

The first operator network access processing unit is configured to use USIM#1 to register with the operator network #1 and notify the operator network #1 that the UE is also equipped with a USIM belonging to other operator network via a registration request signaling during the registration process (equivalent to notifying the operator network #1 that the UE is configured as a multi-card terminal).

The non-first operator network access processing unit is configured to, after the registration with the operator network #1 using the USIM#1 is completed, receive a request for information about USIM belonging to the other operator network to be used by the UE initiated by the operator network #1; and feedback the information about USIM of other operator networks to the operator network#1.

The configuration operation unit is configured to, in response to receiving configuration information for other operator network sent by the operator network #1, use USIM of other operator network to operate in other operator network to which the UE belongs according to the received configuration information.

Among them, the configuration information for other operator network is set by operator network #1 according to USIM#1 and/or information about USIM of other operator network. The configuration information set by operator network #1 is mainly to avoid that the performance of the first system (i.e. the operator network #1 system) is affected due to the operation for other system, including at least: time information of listening for paging belonging to other operator network, measurement time information of listening for USIM belonging to other operator network, and a reading time of listening for the system message belonging to other operator network, etc.

Regarding the apparatus in the foregoing example, the specific manner in which each unit performs operation has been described in detail in the example of the method, and detailed description will not be given herein.

The architecture of a multi-card UE shown in this example includes a memory and a processor. The operation process of this multi-card UE is described below.

The memory is used to store instructions executable by the processor.

The processor is configured to execute the following instructions:

receiving a registration request initiated by UE using USIM#1 and performing the registration operator and receiving a notification sent by the UE that the UE is a multi-card terminal during the registration, that is, the notification indicates that the UE also uses the USIM belonging to other operator network;

after the UE completes the registration, it is determined that whether the UE is configured as multi-card terminal, that is, it is determined whether it has received a notification that the UE also uses the USIM of other operator network, if this notification is received, it is considered that the UE is a multi-card terminal), in response to determining that the UE is configured as the multi-card terminal, send, to the UE, a request for obtaining information about a USIM belonging to other operator network used by the UE, and receiving the information of other operator networks (such as IMSI) used by the UE, which is feedback by the UE;

according to the UE using USIM#1 and/or the received USIM information of the other operator network to be used by the UE, setting configuration information aimed at the other operator network for the UE and sending it to the UE, so as to notify the UE to operate in other operator network to which the UE belongs by using other USIM according to the received configuration Information.

Among them, the configuration information of the USIM for other operator network includes at least one of following: time information of listening for paging belonging to the other operator network, measurement time information of listening for USIM belonging to the other operator network, and a reading time of listening for a system message belonging to the other operator network.

In this example, the operator network device sets the configuration information aimed at other operator network for the multi-card UE, and the UE communicates according to this configuration information, which can reduce the impact on the present operator network when the multi-card UE is operated in the other operator network. This is because when the UE disconnects the RRC connection and leaves during the communication with the present operator network, the present operator network can determine, according to the preset configuration information of the UE using other USIMs, that UE's leaving is caused by the wireless network or by the listening operation of other operator network. For example, in the case that the UE is offline (i.e., the UE leaves) is caused by the UE's listening operation on other operator network, the operator network device may not actively page the UE, but wait for the UE to complete the listening operation to the other operator system, and then the UE will actively establish a connection with the present operator network again, which can reduce the waste of paging resources and also reduce the probability of paging collisions.

In this example, the processor of the operator network device, in addition to receiving the notification initiated actively by the UE that the UE is a multi-card terminal, can also get information about whether the UE is a multi-card terminal in other ways. For example, the operator network device may actively send a request to the UE or other network element to obtain information about whether the UE is a multi-card terminal, etc. This disclosure does not impose special limitation on this.

An operator network device (for example, a network device such as a core network server) shown in this example includes at least a determining unit and a configuration unit. The following describes the working process of the operator network device.

The determining unit is configured to: after a registration with an operator network by user equipment (UE) is completed, in response to determining that the UE is a multi-card terminal, requesting, to the UE, obtaining information about a Universal Subscriber Identity Module (USIM) belonging to other operator network used by the UE, the other operator network is an operator network other than the present operator network.

The configuration unit is configured to receive the information about the USIM belonging to the other operator network used by the UE, which is fed back by the UE; calculate, based on the received information about the USIM, configuration information for the other operator network by the UE, and send the configuration information to the UE; and notify the UE to operate in the other operator network according to the configuration information.

Regarding the operator network device in the foregoing example, the specific manner in which each unit performs operations has been described in detail in the example of the method, and detailed description will not be given here.

According to another aspect of the disclosure, there is provided multi-card user equipment (UE). The multi-card user equipment (UE) may include: a non-first operator network access processing unit configured to: after a registration with a first operator network using a first Universal Subscriber Identity Module (USIM) is completed, in response to receiving a request for obtaining information about a USIM belonging to a non-first operator network used by the multi-card UE, feedback, based on the requesting, the information about USIM belonging to the non-first operator network to the first operator network, wherein the request is initiated by the first operator network; and a configuration operation unit configured to receive configuration information for the non-first operator network sent by the first operator network, and operate in the non-first operator network according to the received configuration information.

According to another aspect of the disclosure, there is provided an operator network device. The operator network device may include: a determining unit configured to: after a registration with an operator network by user equipment (UE) is completed, in response to determining that the UE is a multi-card terminal, requesting, to the UE, obtaining information about a Universal Subscriber Identity Module (USIM) belonging to other operator network used by the UE, the other operator network is an operator network other than the operator network; and a configuration unit configured to receive the information about the USIM belonging to the other operator network used by the UE, which is fed back by the UE; calculate, based on the received information about the USIM, configuration information for the other operator network by the UE, and send the configuration information to the UE; and notify the UE to operate in the other operator network according to the configuration information.

According to yet another aspect of the disclosure, there is provided an operator network device. The operator network device may include: a processor; memory for storing instructions executable by the processor; wherein the processor is configured to: after a registration with an operator network by user equipment (UE) is completed, in response to an operator network device determining that the UE is a multi-card terminal, requesting, to the UE, obtaining information about a Universal Subscriber Identity Module (USIM) belonging to other operator network used by the UE, the other operator network is an operator network other than the operator network; and receiving the information about the USIM belonging to the other operator network used by the UE, which is fed back by the UE; calculating, based on the received information about the USIM, configuration information for the other operator network by the UE, and sending the configuration information to the UE; and notifying the UE to operate in the other operator network according to the configuration information.

The technical solutions provided by the examples of the present disclosure may include the following beneficial effects: preventing the multi-card UE from affecting the performance of the first system due to operations of the multi-card UE in other systems.

Those skilled in the art will easily think of other examples of the present invention after considering the specification and practicing the invention disclosed herein. This application is intended to cover any variations, uses, or adaptive changes of the present invention. These variations, uses, or adaptive changes follow the general principles of the present invention and include common knowledge or conventional technical means in the technical field not disclosed in this disclosure. The description and the examples are to be regarded as exemplary only, and the true scope and spirit of the present invention are pointed out by the following claims.

It should be understood that the present invention is not limited to the precise structure that has been described above and shown in the drawings, and various modifications and changes can be made without departing from its scope. The scope of the present invention is only limited by the appended claims.

INDUSTRIAL APPLICABILITY

In the technical solution in the present disclosure, the operator #1 that runs the first system for the multi-card UE can configure, based on the UE's USIM#1 and information about other USIM (for example, USIM#2, USIM#3, etc.), the configuration information of other USIMs except for the USIM#1, to avoid affecting the performance of the first system due to the operation of other systems.

What is claimed is:

1. A communication method for multi-card user equipment (UE), comprising:
registering with a first operator network by the multi-card UE using a first Universal Subscriber Identity Module (USIM);
in response to receiving a request for obtaining information about a USIM belonging to a non-first operator network used by the multi-card UE, feeding back, by the multi-card UE, the information about the USIM belonging to the non-first operator network to the first operator network, wherein the request is initiated by the first operator network; and
receiving, by the multi-card UE, configuration information for the non-first operator network sent by the first operator network, wherein the configuration information is configured by the first operator network for the multi-card UE based on the information about the USIM belonging to the non-first operator network; and
listening for, by the multi-card UE, the non-first operator network according to the received configuration information; wherein
the configuration information for the non-first operator network comprises at least one of following:
time information of listening for paging belonging to the non-first operator network, measurement time information of listening for the USIM belonging to the non-first operator network, or a reading time of listening for a system message belonging to the non-first operator network.

2. The communication method according to claim 1, further comprising:
notifying the first operator network that the multi-card UE initiating the registration is a multi-card terminal, during the registration of the multi-card UE with the first operator network using the first USIM.

3. The communication method according to claim 2, wherein the notifying, by the multi-card UE, the first operator network that the multi-card UE initiating the registration is the multi-card terminal comprises:
  sending, by the multi-card UE, a registration request signaling to the first operator network during the registration, to notify the first operator network that the multi-card UE initiating the registration is the multi-card terminal.

4. The communication method according to claim 1, wherein the information about the USIM belonging to the non-first operator network used by the multi-card UE comprises International Mobile Subscriber Identity number (IMSI) of the multi-card UE.

5. The communication method according to claim 1, further comprising:
  notifying the first operator network that the multi-card UE initiating the registration is a multi-card terminal, during the registration of the multi-card UE with the first operator network using the first USIM.

6. Multi-card user equipment (UE), comprising:
  a processor; and
  a memory for storing instructions executable by the processor;
  wherein the processor is configured to:
  register with a first operator network by the multi-card UE using a first Universal Subscriber Identity Module (USIM);
  in response to receiving a request for obtaining information about a USIM belonging to a non-first operator network used by the multi-card UE, feedback, by the multi-card UE, the information about the USIM belonging to the non-first operator network to the first operator network, wherein the request is initiated by the first operator network; and
  receive, by the multi-card UE, configuration information for the non-first operator network sent by the first operator network, wherein the configuration information is configured by the first operator network for the multi-card UE based on the information about the USIM belonging to the non-first operator network; and
  listen for, by the multi-card UE, the non-first operator network according to the received configuration information; wherein
  the configuration information for the non-first operator network comprises at least one of following:
  time information of listening for paging belonging to the non-first operator network, measurement time information of listening for the USIM belonging to the non-first operator network, or a reading time of listening for a system message belonging to the non-first operator network.

7. The multi-card UE according to claim 6, wherein the processor is further configured to:
  notify the first operator network that the multi-card UE initiating the registration is a multi-card terminal, during the registration of the multi-card UE with the first operator network using the first USIM.

8. The multi-card UE according to claim 7, wherein the processor is specifically configured to:
  send a registration request signaling to the first operator network during the registration, to notify the first operator network that the multi-card UE initiating the registration is the multi-card terminal.

9. The multi-card UE according to claim 6, wherein the information about the USIM belonging to the non-first operator network used by the multi-card UE comprises International Mobile Subscriber Identity number (IMSI) of the multi-card UE.

10. A communication method for an operator network device, comprising:
  after a registration with the operator network device by user equipment (UE) is completed, in response to the operator network device determining that the UE is a multi-card terminal, requesting, by the operator network device to the UE, obtaining information about a Universal Subscriber Identity Module (USIM) belonging to another operator network used by the UE, the another operator network is an operator network other than the operator network device; and
  receiving, by the operator network device, the information about the USIM belonging to the another operator network used by the UE, which is fed back by the UE; calculating, based on the received information about the USIM, configuration information for the another operator network, and sending the configuration information to the UE; and notifying the UE to listen for the another operator network according to the configuration information; wherein
  the configuration information for the another operator network comprises at least one of following:
  time information of listening for paging belonging to the another operator network, measurement time information of listening for the USIM belonging to the another operator network, or a reading time of listening for a system message belonging to the another operator network.

11. The communication method according to claim 10, wherein the operator network device determining that the UE is the multi-card terminal comprises:
  receiving, by the operator network device, a notification sent by the UE that the UE is a multi-card terminal during the registration, and determining, by the operator network device, that the UE is the multi-card terminal according to the notification.

12. The communication method according to claim 11, wherein the receiving, by the operator network device, a notification sent by the UE that the UE is the multi-card terminal comprises:
  receiving, by the operator network device, a registration request signaling sent by the UE during the registration, and the registration request signaling is used to notify the operator network device that the UE initiating the registration is a multi-card terminal.

13. The communication method according to claim 10, wherein the information about the USIM of the another operator network used by the UE comprises International Mobile Subscriber Identity number (IMSI) of the multi-card user equipment.

* * * * *